United States Patent Office 3,605,968
Patented Sept. 20, 1971

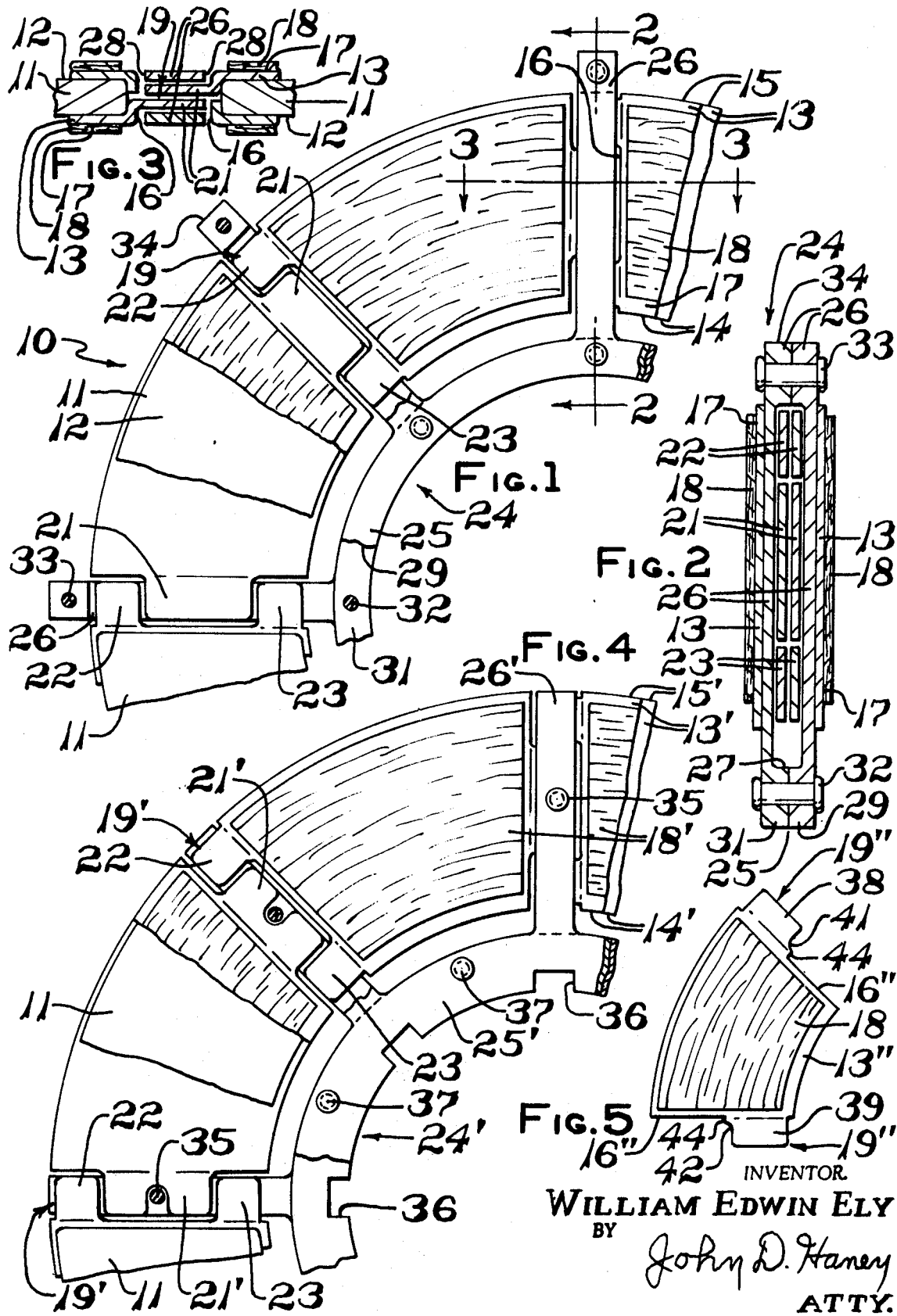

3,605,968
SEGMENTED FRICTION MEMBER FOR BRAKE OR CLUTCH
William Edwin Ely, Troy, Ohio, assignor to The B. F. Goodrich Company, New York, N.Y.
Filed Sept. 18, 1969, Ser. No. 859,059
Int. Cl. F16d *13/64, 65/12*
U.S. Cl. 192—107R      7 Claims

ABSTRACT OF THE DISCLOSURE

An annular segmented friction disc member for use as a rotor or stator in a disc-type brake or clutch assembly in which a plurality of circumferentially spaced-apart heat-absorbing segments are held between pairs of segmental facing members. Each facing member has circumferential extensions at the ends which overlap the extensions of adjacent facing members and are retained by radial members connected to an annular ring providing a unitary disc structure.

BACKGROUND OF THE INVENTION

This invention relates to disc-type brakes or clutches and particularly to the annular friction disc members which engage other friction members during operation of a brake or clutch. A friction lining may be carried by these friction disc members or they may have surfaces which engage friction linings carried by other friction members. They may also be used as rotors or stators depending upon whether they are in engagement with a rotating part such as a wheel or a nonrotating part such as a torque tube attached to a wheel support.

These friction disc members when used in high energy brakes such as those for aircraft must absorb great quantities of heat during the braking operation and are subject to extreme temperature changes. It has been found that with a solid annular friction disc member these changes in temperature and the great amount of heat which is generated causes thermal warpage and cracking of the disc. To overcome these problems friction disc members have been designed with segmented friction components in which the crack-producing stresses are reduced and the thermal warpage is accommodated through provisions for clearance between the parts.

Different designs of segmented friction disc members have been made to overcome the difficulties from thermal conditions which have been experienced with solid annular friction disc members and at the same time provide a unitary, stable and functionally effective friction member. One unique and effective design in which a spider is employed for retaining the brake segments is shown in the patent to Robins et. al., No. 3,397,760. In this design a plurality of arcuate friction lining segments are aligned end to end in an annular assembly by interfitting mating ends on each of the segments. The radial projections of the spider embrace the mated interfitting segment ends to retain the annular arrangement of the segments. In this particular design the segments may carry a friction lining or may be in direct frictional engagement with other brake parts.

In a friction disc member with segments held by a spider, the segments themselves are the primary heat-absorbing members or "heat-sink elements" and therefore the capacity of the brake is limited by the heat-absorbing properties of these segments. Furthermore, since these segments are structural members of the disc, the materials which can be used are limited to those with adequate strength and wear resistance. For example, a material such as beryllium has much better heat-absorbing properties than steel for a part of the same size; however, beryllium is frangible and deteriorates under the wear and shock which are imposed upon a friction disc member during operation of a high energy brake. It can, therefore, be seen that a segmental disc construction is needed in which beryllium and other heat absorbing materials can be used without having the limitations as to strength and resistance to wear and shock which the segments of discs used heretofore must have.

SUMMARY OF THE INVENTION

In accordance with this invention the segments of heat-absorbing material can be of a large number of heat-absorbing materials which need not have high strength or wear properties. Each segment is held between facing members or cover plates which transmit the torque and take the wear either as lining carriers or in direct engagement with other friction members of the brake. These facing members have circumferential extensions at the radial edges which interfit with the extensions of adjacent facing members and are loosely embraced by radial retaining arms of a spider. By overlapping the extensions of adjacent facing members, the necessary connection between the segmental parts of the annular friction disc member is provided which requires only two thicknesses of the facing members and two thicknesses of the spider arms. The total thickness must be less than the thickness of the heat-absorbing segment and two thicknesses of the facing members to provide the necessary clearance between rotating and nonrotating friction members. This connection also provides for clearance between the facing member extensions and the spider arms to accommodate the distortions and changes in shape due to the extreme thermal conditions which these parts are subjected to.

The accompanying drawings show one preferred form made in accordance with and embodying this invention and which is representative of how this invention may be practiced.

BRIEF DESCRIPTION OF THE DRAWINGS

In the drawings:

FIG. 1 is a partial axial view of the friction member assembly with certain parts being broken away;

FIG. 2 is an enlarged cross section on the line 2—2 of FIG. 1;

FIG. 3 is an enlarged cross section on the line 3—3 of FIG. 1;

FIG. 4 is a partial axial view of a modification of the invention with certain parts being broken away; and, FIG. 5 is an axial view of another form of facing member which may be used in the modification shown in FIG. 4.

DETAILED DESCRIPTION

Referring to FIG. 1, friction disc assembly 10 contains a series of arcuate sector-shaped segments 11 which are disposed in spaced-apart positions and in an annular ring. These segments 11 are of heat-absorbing material such as beryllium, graphite and carbon, which have properties conducive to heat absorption; however, other less heat-absorbent materials may also be used in certain applications. Axial faces 12 of the segments 11 are covered by pairs of facing members such as cover plates 13 which may be of steel or other high strength wear-resistant material. The segments 11 are held against movement in the circumferential and radial directions by the radially inner and outer edges 14 and 15 and by the radial edges 16 of the cover plates 13. These edges 14, 15 and 16 are bent inwardly toward the segments 11 and form flanges for restraining the movement of the segments.

The cover plates 13 have outer axial faces 17 which may directly engage other braking members or, as shown in FIGS. 1, 2 and 3, may have friction linings 18 fastened thereto as by sintering. The linings 18 may be of the type described and set forth in U.S. Pat. No. 2,966,737 of R. E. Spokes et al.

Extending circumferentially from the radial edges 16 of the cover plates 13 are circumferential extensions or lugs 19. The lugs 19 of corresponding adjacent cover plates 13 are located in the same plane and therefore are disposed in interfitting relation as shown in FIG. 1. One cover plate 13 has a medial lug 21 whereas the adjacent cover plate on the same side of the disc assembly 10 has spaced-apart lugs 22 and 23. Clearance is provided between the medial lug 21 and the spaced-apart lugs 22 and 23 to permit relative movement resulting from thermal expansion and contraction of the brake parts.

The lugs 19 extending from one end of each pair of cover plates 13 have a medial lug 21 extending from one cover plate and spaced-apart lugs 22 and 23 extending from the other cover plate. These lugs 19 overlap the corresponding lugs having the same configuration and extending from an adjacent pair of cover plates 13. The total thickness of the overlapping lugs 19 is, therefore, only equal to twice the thickness of one of the cover plates 13 and not four times the thickness which would be the case if overlapping interfitting lugs were not used.

A spider 24 holds the cover plates 13 together and includes an annular ring 25 with pairs of radially extending retaining members such as arms 26 which embrace the lugs 19. Radially outward movement of the cover plates 13 is restricted by the lugs 19 which engage connecting flanges 27 at the radially outer end of the arms 26 whereas circumferential movement of the cover plates 13 is limited by engagement of the radial edges 16 of the cover plates with edges 28 of the arms.

The spider 24 may be assembled from two spider stampings 29 and 31 which are connected or fastened by rivets 32 radially inward of the radially inner edge 14 of the cover plates 13 and rivets 33 radially outward of the radially outer edge 15 of the cover plates.

The outer extremities or ends 34 of arms 26 may be used as driving keys, if desired, when the friction member is to be used as a rotor disc, for example, in a high energy disc brake such as those used for aircraft. In this service the friction member assembly 10 would be assembled axially into the rotatable part of the brake (usually the wheel or parts connected to the wheel) with the ends 34 interlocking with complementary-shaped recesses in the rotatable members in spline-like engagement. Under these circumstanes torque is transmitted to the ends 34 of arms 26 from the rotatable member and in turn to the cover plates 13 by the engagement of the edges 28 of the arms with radial edges 16 of the cover plate.

In FIG. 4 there is shown a modification in which the arms 26' of the spider 24' are fastened together by rivets 35 located at a position intermediate the radially inner edge 14' and radially outer edge 15' of the cover plates 13'. Accordingly, the medial lugs 21' have openings 26 through which the rivets 35 may pass. The spider ring 25' has axial slots 36 at the inner radial edge for engagement with splines of a torque-transmitting member (not shown) such as a torque tube of an aircraft wheel assembly. With this construction the arms 26' do not extend beyond the radially outer edge 15 of the cover plate 13' and provide a construction which is specially adaptable for use as a stator.

A friction lining 18 is secured to the cover plates 13' which hold segments 11 in position and which have overlapping interfitting lugs 19'. The arms of the spider 26' embrace the lugs 19' which are held together by the rivets 35 and also by rivets 37 passing through the annular ring 25' of the spider.

A further modification of the facing member is shown in FIG. 5 in which each of the cover plates 13" has a circumferentially extending outer lug 38 extending from one radial edge 16" and an inner lug 39 extending circumferentially from a radial edge at the other end of the cover plate. These lugs 38 and 39 have recesses 41 and 42 at medial edges 43 and 44 through which the rivets 35 may pass. The cover plate 13" may also carry a friction lining 18.

In the modification of FIG. 5 the lugs 19" extending from one end of a pair of axially spaced cover plates 13" are in radially spaced-apart positions and the lugs extending from circumferentially adjacent cover plates are in overlapping relation. These lugs 19" are held between arms 26' fastened together by rivets 35 and attached to ring 25' of the spider 24' in an assembly like that shown in FIG. 4.

I, therefore, particularly point out and distinctly claim as my invention:

1. An annular segmented friction member for a brake or clutch comprising circumferentially spaced-apart segments of heat-absorbing material, each segment having a pair of facing members of wear-resistant high-strength material for retaining the segment and covering both axial faces of the segment, said facing members having circumferential extensions at the radial edges thereof extending towards the adjacent segment and overlapping extensions of the facing members of such adjacent segment, and pairs of radially extending retaining members disposed in the spaces between said segments and on both sides of the facing member extensions to hold the extensions in position, each of said pairs of radially extending members being connected together and adapted for engagement with a rotating or non-rotating member for transmitting torque.

2. A segmented friction member according to claim 1 wherein the extensions of one facing member of each pair of facing members are radially offset from the extensions of the other facing member at the same radial edge to provide only one thickness of material extending from each segment and thereby provide a connection between circumferentially adjacent facing members having a total thickness equal to two thicknesses of the facing members.

3. A segmented friction member according to claim 2 wherein one facing member of each pair has circumferential extensions disposed at radially spaced-apart positions and the other facing member of said pair has a medial extension at the corresponding radial edge disposed between said extensions of the first-mentioned facing member.

4. A segmented friction member according to claim 3 wherein each of said pairs of retaining members are connected at a position intermediate the radially inner and radially outer edges of said facing members and said medial extension has an opening through which connecting fasteners may pass.

5. A segmented friction member according to claim 3 wherein the extensions of the facing members covering one axial face of said segments are in one plane, the extensions of the facing members covering the other axial faces of said segments are in another plane and the extensions of the circumferentially adjacent facing members in the same planes are in an interfitting relationship.

6. A segmented friction member according to claim 2 wherein one facing member has an outer extension disposed at a radially outward position and the other facing member has an inner extension disposed at a radially inward position and spaced radially from said outer extension.

7. A segmented friction member according to claim 6 wherein each of said pairs of said retaining members are connected at a position intermediate the radially inner and outer edges of said facing members and have a fastener passing through an opening between said inner extension and said outer extension.

References Cited
UNITED STATES PATENTS 3,397,760   8/1968   Robins et al. _____ 192—107(R)
3,403,759  10/1968   Holcomb, Jr. ____ 192—107(R)X ALLAN D. HERMANN, Primary Examiner U.S. Cl. X.R.
188—73.2, 218XL